US012711695B2

(12) United States Patent
Wang

(10) Patent No.: US 12,711,695 B2
(45) Date of Patent: Aug. 18, 2026

(54) IMAGE RENDERING METHOD AND APPARATUS, ELECTRONIC DEVICE, AND STORAGE MEDIUM

(71) Applicant: Beijing Bytedance Network Technology Co., Ltd., Beijing (CN)

(72) Inventor: Guangwei Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 88 days.

(21) Appl. No.: 18/712,208

(22) PCT Filed: Nov. 21, 2022

(86) PCT No.: PCT/CN2022/133161
§ 371 (c)(1),
(2) Date: May 21, 2024

(87) PCT Pub. No.: WO2023/088458
PCT Pub. Date: May 25, 2023

(65) Prior Publication Data
US 2025/0014261 A1 Jan. 9, 2025

(30) Foreign Application Priority Data
Nov. 22, 2021 (CN) ......................... 202111389280.6

(51) Int. Cl.
*G06T 15/08* (2011.01)
*G06T 15/50* (2011.01)

(52) U.S. Cl.
CPC ............ *G06T 15/08* (2013.01); *G06T 15/506* (2013.01)

(58) Field of Classification Search
CPC ......... G06T 15/06; G06T 15/08; G06T 15/50; G06T 15/506
See application file for complete search history.

(56) References Cited

U.S. PATENT DOCUMENTS 5,781,194 A 7/1998 Ponomarev et al.
2022/0335636 A1* 10/2022 Bi .......................... G06T 15/06

FOREIGN PATENT DOCUMENTS

CN 106023300 A 10/2016
CN 111145336 A 5/2020
(Continued)

OTHER PUBLICATIONS

Zheng, Quan, Gurprit Singh, and Hans-Peter Seidel. "Neural relightable participating media rendering." Advances in Neural Information Processing Systems 34 (2021): 15203-15215. (Year: 2021).*
(Continued)

*Primary Examiner* — Ryan Mcculley
(74) *Attorney, Agent, or Firm* — Alleman Hall LLP

(57) ABSTRACT

The disclosure provides an image rendering method and apparatus, an electronic device, and a storage medium. The image rendering method includes: obtaining target camera association information and target light source association information; determining target voxel association information of each voxel in a target object based on the target camera association information, the target light source association information, and a pre-trained target object attribute determination model; and rendering a target structure image corresponding to the target object based on the target voxel association information of each voxel.

18 Claims, 5 Drawing Sheets

Obtain target camera association information and target light source association information — S110

↓

Determine target voxel association information of each voxel in a target object based on the target camera association information, the target light source association information, and a pre-trained target object attribute determination model — S120

↓

Render a target structure image corresponding to the target object based on the target voxel association information of each voxel — S130

(56) References Cited

FOREIGN PATENT DOCUMENTS

| | | | |
|---|---|---|---|
| CN | 112258622 | A | 1/2021 |
| CN | 112634430 | A | 4/2021 |
| CN | 112927363 | A | 6/2021 |
| CN | 113628348 | A | 11/2021 |
| CN | 113643416 | A | 11/2021 |
| JP | 2019179539 | A | 10/2019 |

OTHER PUBLICATIONS

ISA China National Intellectual Property Administration, International Search Report Issued in Application No. PCT/CN2022/133161, Feb. 11, 2023, WIPO, 2 pages.

* cited by examiner

IMAGE RENDERING METHOD AND APPARATUS, ELECTRONIC DEVICE, AND STORAGE MEDIUM

CROSS-REFERENCE TO RELATED APPLICATION(S)

This application is a U.S. National Stage Application of PCT Application Serial No. PCT/CN2022/133161, filed Nov. 21, 2022, which claims priority to Chinese Patent Application No. 202111389280.6, filed with China National Intellectual Property Administration on Nov. 22, 2021, the disclosures of which are incorporated herein by reference in their entireties.

FIELD

The disclosure relates to the field of computer technology, and for example, relates an image rendering method and apparatus, an electronic device, and a storage medium.

BACKGROUND

Image rendering is one of important research directions in graphics. The conventional image rendering method is typically based on a multi-view technology to synthesize virtual perspectives. By obtaining a texture image and a depth image of an object, a new perspective image of the object is synthesized by using the texture image and the depth image of the existing perspective.

However, in the process of object rendering, there is a technical problem that a rendered image does not match an actual object image, which leads to the low accuracy of the rendered image, causing poor use experience to users.

SUMMARY

The disclosure provides an image rendering method and apparatus, an electronic device, and a storage medium, so as to achieve accurate rendering of an internal structure of a translucent object, make a rendered image closely matched with an effect presented by the object in reality, and improve object image rendering accuracy.

In a first aspect, the disclosure provides an image rendering method. The method includes: obtaining target camera association information and target light source association information; determining target voxel association information of each voxel in a target object based on the target camera association information, the target light source association information, and a pre-trained target object attribute determination model; and rendering a target structure image corresponding to the target object based on the target voxel association information of each voxel.

In a second aspect, the disclosure further provides an image rendering apparatus. The apparatus includes: a target association information obtaining module, configured to obtain target camera association information and target light source association information; a target voxel association information determining module, configured to determine target voxel association information of each voxel in a target object based on the target camera association information, the target light source association information, and a pre-trained target object attribute determination model; and a target structure image rendering module, configured to render a target structure image corresponding to the target object based on the target voxel association information of each voxel.

In a third aspect, the disclosure further provides an electronic device. The device includes: one or more processors; and a storage means, configured to store one or more programs. When the one or more programs are executed by the one or more processors, the one or more processors are caused to implement the above image rendering method.

In a fourth aspect, the disclosure further provides a computer-readable storage medium, storing a computer program. The program, when executed by a processor, implements the above image rendering method.

DETAILED DESCRIPTION OF EMBODIMENTS

Embodiments of the disclosure will be described with reference to the accompanying drawings. Although the accompanying drawings show some embodiments of the disclosure, the disclosure may be implemented in various forms, and these embodiments are provided for understanding the disclosure. The accompanying drawings and the embodiments of the disclosure are for exemplary purposes only.

A plurality of steps recorded in method implementations in the disclosure may be performed in different orders and/or in parallel. In addition, the method implementations may include additional steps and/or omit the execution of the shown steps. The scope of the disclosure is not limited in this aspect.

The term "including" and variations thereof used in this specification are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". The related definitions of other terms will be provided in the subsequent description.

Concepts such as "first", and "second" mentioned in the disclosure are only for distinguishing different apparatuses, modules, or units, and are not intended to limit the order or relation of interdependence of functions performed by these apparatuses, modules, or units. Modifications such as "a" and "a plurality of" mentioned in the disclosure are indicative rather than limiting, and those skilled in the art should understand that unless otherwise specified in the context, it should be interpreted as "one or more".

Before introducing the technical solution, application scenarios may be first exemplarily described. The technical solution may be applied to scenarios where a three-dimensional view of any translucent object is rendered. For example, there is a jade stone in real life that needs to be displayed on a computer device, in this case, internal structural information of the jade stone can be determined based on the technical solution of the disclosure, and then the corresponding three-dimensional view can be rendered. The technical solution can be introduced by rendering a structural view of one object as an example. Accordingly, the object corresponding to the target structural view to be rendered can be referred to as a target object.

If target structural views of different objects need to be rendered, an object attribute determination model corresponding to each object can be obtained through training, and then corresponding target voxel association information is obtained through processing based on the different models.

Embodiment 1

Figure 1:
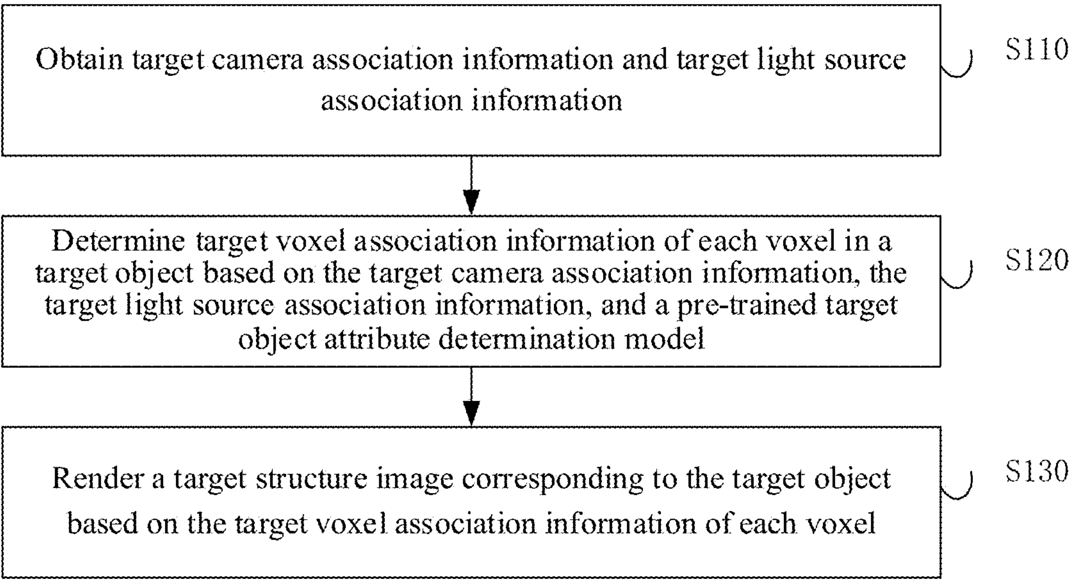
FIG. 1 is a flowchart of an image rendering method according to Embodiment 1 of the disclosure.

FIG. 1 is a schematic flowchart of an image rendering method according to Embodiment 1 of the disclosure. This embodiment is applicable to a situation of performing view rendering on a translucent object. The method can be performed by an image rendering apparatus. The apparatus may be implemented in the form of software and/or hardware. The hardware may be an electronic device, such as a mobile terminal, a personal computer (PC) terminal, or a server.

As shown in FIG. 1, the method in this embodiment includes the following:

S110: target camera association information and target light source association information are obtained.

The target camera association information may include a relative distance, a relative angle and the like between a target camera (camera device) and a specific object (target object) when the target camera is used for shooting an image for the specific object. A target light source may be a light source that illuminates the object, meaning that any beam capable of illuminating the object can serve as the target light source. In this embodiment, the target light source is a light source currently used. Correspondingly, the target light source association information is at least one of relative angle information between the light source and the target object, light source color information, color temperature information, and light intensity information when the target light source illuminates the target object.

To obtain the camera association information and the light source association information, the camera and the light source may be connected with the computer device, such that the camera association information is obtained based on the computer device. Meanwhile, the light source may be controlled based on the computer device to emit corresponding light rays, thereby obtaining the light source association information.

When a view of a translucent object needs to be rendered and displayed on the computer device to be viewed by a user, the view of the target object can be rendered based on the solution, and in this case, the camera association information and the light source association information need to be obtained.

S120: target voxel association information of each voxel in the target object is determined based on the target camera association information, the target light source association information, and a pre-trained target object attribute determination model.

The target object attribute determination model may be a pre-trained deep learning model, which can process the target camera association information and the target light source association information and output attribute information of a specific element in the corresponding target object. The target object may be a specific object in reality, such as a jade stone, a candle, a plant leaf, and other objects. The attribute information may be material information, shape information (geometric information), color, texture, smoothness, transparency, and other information for each voxel in the object. The voxel may be the smallest unit of information divided from volume information of the object in a three-dimensional space, which may be described by a three-dimensional array with a corresponding value. The voxel may be represented by the smallest unit in a three-dimensional space data field. For example, the object may be a translucent jade stone, and the three-dimensional space may be a three-dimensional data field corresponding to the jade stone. A series of slice data of a jade stone image may be obtained through compilation based on a computer program, and then is subject to regularized processing according to a position, an angle, and other information, thereby forming a regular data field composed of uniform grids in the three-dimensional space. Each node on the grid describes attribute information such as the density of a structural object in the jade stone. A small cube enclosed by the corresponding eight nodes between adjacent layers may be taken as the smallest unit in the three-dimensional data field, represented as the voxel. Correspondingly, all voxel information in the object may describe the internal structure of the object. The target voxel association information may be corresponding voxel information used for describing the internal structure of the target object, such as transparency information and color information. Based on the above, it can be known that one object may be composed of a plurality of voxels, and association information of each voxel may be taken as target association information.

In this embodiment, the reason for adopting the object made of a translucent material as the target object is that when the light source emits light rays, the light rays can penetrate through a surface of the object to enter the object, thereby determining voxel association information of each position point, and then rendering a schematic diagram of the internal structure of the object based on the voxel association information. The translucent object in reality can be accurately represented according to the obtained schematic diagram of the internal structure.

When the light source emits light rays, and the light rays penetrate through the translucent object structure, the light rays may be reflected when encountering an opaque structure part in the object, and the reflected light rays may enter the camera. When encountering the translucent structure part, the light rays may be reflected/refracted, and the refracted light rays may have different degrees of light ray attenuation based on different association information such as a material, texture, and transparency of the voxels in the object. Correspondingly, refracted/reflected light rays with different attenuation degrees may be generated inside the object, and by obtaining light ray refraction/reflection information of each position point in the object, voxel association information of the corresponding position point may be represented by using light ray refracting/reflecting angles and attenuation degree information, and the voxel association information of each voxel in the object is determined, thereby rendering the schematic diagram of the internal structure of the object based on the voxel association information of each voxel.

In this embodiment, for the target object attribute determination module, the target camera association information and the target light source association information of the target object may be inputted into the model, and based on the model, the target voxel association information of each voxel in the object may be outputted.

S130: a target structure image corresponding to the target object is rendered based on the target voxel association information of each voxel.

The target structure image may be a three-dimensional model image corresponding to the internal structure of the target object. That is, the target structure image can faithfully reflect, in a three-dimensional manner, the effect presented by the internal structure of the target object in reality.

Based on the target voxel association information of each voxel in the target object, the internal structure of the target object can be rendered, thereby rendering the target structure image. Exemplarily, to render the structural schematic diagram of the translucent object, the object can be divided into a plurality of voxels, and after the target voxel association information of each voxel in the object is determined based on the model, a rendering technology can be utilized for representing the target voxel association information of each voxel, and then, a voxel image corresponding to each voxel can be rendered. Then, computer software is utilized for integrating the plurality of voxels, and therefore the target structure image corresponding to the object can be obtained; and a modeling technology may also be utilized for performing three-dimensional reconstruction on the plurality of voxels, so as to render a frame diagram of the object structure. Then, the rendering technology is used for rendering the frame diagram based on the material, texture, transparency, and other association information of each voxel, thereby rendering a colored, textured, and variable-transparency structure image, namely, the target structure image corresponding to the object.

According to the technical solution of this embodiment of the disclosure, by obtaining the target light source association information of the target object at different lighting angles and the target camera association information at different camera shooting angles, the target camera association information and the target light source association information are processed based on the pre-trained target object attribute determination model to obtain the target voxel association information of each voxel in the target object, and finally, based on the target voxel association information of each voxel in the target object, the target structure image corresponding to the target object is rendered. It solves the problems that an image rendering method adopted in the related art cannot determine an internal structure of the object, causing that a rendered schematic diagram is only a schematic diagram of an external structure, meanwhile, a schematic diagram of the internal structure cannot be obtained, and as a result, there is a significant difference between the rendered image and an actual image. It is achieved that in the image rendering process, the internal structure of the object is determined based on the light source information and camera position information, such that the rendered schematic diagram of the internal structure of the target object is matched with an actual structure of the target object, thereby improving accuracy of the rendered image compared to an image corresponding to the actual object, making the displayed image more vivid when the image is displayed on a display interface, and then improving use experience of the user.

Embodiment 2

Figure 2:
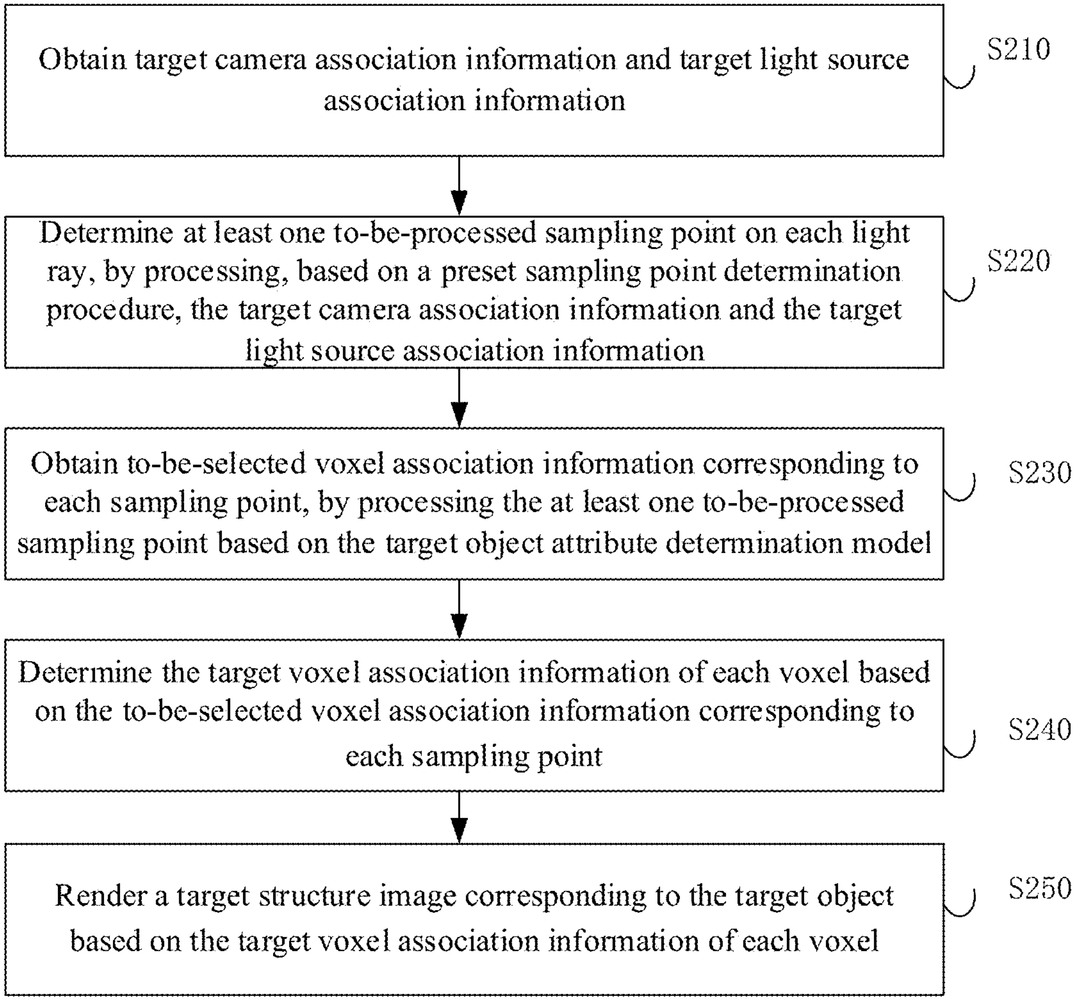
FIG. 2 is a flowchart of an image rendering method according to Embodiment 2 of the disclosure.

FIG. 2 is a schematic flowchart of an image rendering method according to Embodiment 2 of the disclosure. Based on the foregoing embodiment, S110 is described, and for an implementation, reference may be made to the technical solution in this embodiment. Technical terms that are the same with or corresponding to those in the foregoing embodiment are not repeated herein.

As shown in FIG. 2, the method includes the following:

S210: target camera association information and target light source association information are obtained.

In this embodiment, the camera association information includes a camera position and orientation information, and the light source association information includes a light source position and a lighting direction of a light source.

The camera position may be position information of a camera when shooting a target object. The orientation information may be included angle information when light rays emitted by the camera for shooting the target object intersect with the target object. The camera association information may be represented by parameters of at least three dimensions. For example, parameters of six dimensions may be adopted, where three dimensions are used for representing the camera position information, and three parameters are used for representing the orientation information. The light source position may be light ray starting point position information when the light source emits light rays to illuminate the object. The lighting direction may be a direction of light rays emitted by the light source. The light source association information may be represented by parameters of at least three dimensions. For example, parameters of six dimensions may be adopted, where three dimensions are used for representing the light source position information, and three parameters are used for representing the lighting direction information. The camera and the light source may be connected with the computer device so as to acquire the camera position and orientation information based on the computer device. Meanwhile, the light source may be controlled based on the computer device to emit corresponding light rays, thereby obtaining the light source position and the lighting direction of the light source.

When a view of a translucent object needs to be rendered, the camera position and orientation information, as well as the light source position and the lighting direction of the light source may be obtained, such that the target object attribute determination model obtained by training processes the above information so as to obtain the target voxel association information of each voxel in the target object, and based on the target voxel association information, the schematic diagram of the target structure of the target object under the light source is determined.

S220: at least one to-be-processed sampling point on each light ray is determined, by processing, based on a preset sampling point determination procedure, the target camera association information and the target light source association information.

The sampling point determination procedure may be program code preset by technical personnel, and the program code may divide the light ray into a plurality of sampling points. The to-be-processed sampling point is a sampling point on each light ray processed by the sampling point determination procedure.

When the light source emits the light rays, the light rays may penetrate through the surface of the object to enter the object, that is, the to-be-processed sampling point in the light ray may be located inside the object to correspond to a position point in the object. Therefore, information of each to-be-processed sampling point may be used for determining voxel association information of each position point in the object, thereby subsequently rendering the schematic diagram of the internal structure of the object based on the voxel association information.

S230: to-be-selected voxel association information corresponding to each sampling point is determined, by processing the at least one to-be-processed sampling point based on the target object attribute determination model.

The to-be-selected voxel association information may be voxel association information corresponding to the to-be-processed sampling point. For example, the information of the at least one to-be-processed sampling point may be inputted into the target object attribute determination model; and then, the model outputs the voxel association information corresponding to each to-be-processed sampling point, and the outputted voxel association information may be taken as the to-be-selected voxel association information.

To facilitate the subsequent faster identification of which one of the plurality of pieces of voxel association information outputted by the model corresponds to each sampling point on the light ray, the sampling points may be labeled according to a number marking rule before being inputted into the model. Exemplarily, taking the sampling points on one light ray as an example, the number marking rule may be a rule that the closer the sampling point is to the light source position, the smaller the number is. The distance between each sampling point and the light source position may be determined, and the distances are sorted in ascending order. Subsequently, the sampling points corresponding to the sorted distances are numbered from 1, may be from 1 to k, and k is a positive constant, which is determined by the number of the sampling points. For example, assuming that A is a sampling point on the light ray, B is another sampling point on the light ray, A is 1 m away from the light source position, B is 1.1 m away from the light source position, the distances are sorted in ascending order, and accordingly, the sampling points corresponding to the distances are labeled in a sequence of the distances. A may be labeled as 1, B may be labeled as 2, and each sampling point may be numbered in order according to the distance between each sampling point and the light source position. Exemplarily, after the light rays of the light source irradiating into the translucent object are obtained, the sampling points-to-be-processed on each light ray may be obtained and taken as an input for the target object attribute determination model, and after model processing, the voxel association information corresponding to each to-be-processed sampling point may be outputted, and the obtained voxel association information may serve as the voxel association information corresponding to each sampling point.

Each voxel has only one color, namely the natural color of the voxel. The color is unrelated to an angle of the incident light ray, and therefore a rendering method may be used for determining the final voxel color. When the final voxel color is determined, a series of beams emitted by the light source may irradiate the target object, and the beams irradiating the object may be reflected to the field of view of the camera, such that the camera shoots the target object. When the beams irradiate the target object, that is, after the beams intersect with the voxels, transparency information and color information of each voxel may be calculated.

The light rays are emitted from the light source to illuminate the object, and when the light rays encounter an opaque voxel, it indicates that the light rays irradiate the object, and in this case, the quantity of refracted light and reflected light for the current voxel may be determined. Meanwhile, when the light rays irradiate the object, the reflected light rays may enter the camera, and in this case, a brightness contribution value of each pixel in an image may be determined. For example, the brightness contribution of the light source to the pixel from the exterior may be calculated, and then, the brightness contribution of the light source to the pixel from the interior may be calculated, namely, a brightness value of a pixel point. For determining the brightness contribution of each voxel of the illuminated object to the current voxel, a line may be drawn from the current voxel to each illuminated voxel, the opacity of each voxel along the path may be obtained through a grid; and based on the opacity, the brightness contribution of each voxel to the current voxel is determined. That is, each voxel may be taken as the current voxel to determine the brightness value of the current voxel.

S240: target voxel association information of each voxel is determined based on the to-be-selected voxel association information corresponding to each sampling point.

The target voxel association information may be voxel association information from the to-be-selected voxel association information. Voxel association information satisfying conditions may be obtained from the to-be-selected voxel association information as the target voxel association information. For example, whether a value of one voxel association information from the to-be-selected voxel association information is empty may be determined, if the value of this voxel association information is not empty, this voxel association information is taken as the target voxel association information, and if the value of the voxel association information is empty, the voxel association information is discarded.

When the light source emits the light rays and the light rays irradiate a plurality of position points in the translucent object, there may be a case that the light rays deviate from the position points of the voxels, that is, the position points irradiated by the light rays correspond to empty voxel association information, and in this case, to improve the image rendering efficiency, drawing or rendering may not be performed on the empty voxel association information. For example, the empty voxel association information may be discarded, that is, the empty voxel association information is discarded in each to-be-selected voxel association information, and then, the target voxel association information is obtained.

S250: a target structure image corresponding to the target object is rendered based on the target voxel association information of each voxel.

In this embodiment, the target voxel association information at least includes color information and light quantity information of voxels.

The color information may be the color of the voxels of the target object under irradiation of the light rays, and the color information of the voxels can be presented by red-green-blue (RGB) colors. For example, the computer device may be utilized for extracting the RGB value of each voxel along the light ray path. The light quantity information may be the brightness value of the voxels in the target object, or the brightness value of the pixel point corresponding to each pixel point in the object in the image. For example, the light quantity information includes a reflection brightness value of the light rays irradiating the voxels, and a refraction brightness value of the light rays refracted from the interior of the voxels. For example, when the light source emits the light rays to irradiate the translucent object, there may be a case of light ray reflection at one position point in the object, and in this case, the brightness contribution of the light rays to the voxel at this position point from the exterior of the object can be calculated. There may also be a case of light ray refraction, and in this case, the brightness contribution of the light rays to the voxel at the position point from the interior of the object can be calculated. A line is drawn from the voxel to each illuminated voxel. The opacity of each voxel along the path can be obtained through a grid. Based on the opacity, the brightness contribution of each voxel to the voxel may be obtained, namely the brightness value of the voxel, and the brightness value is taken as the light quantity information.

In this embodiment, when the image is rendered based on the target voxel association information, relevant information of each voxel in the object may be known, and when a three-dimensional view is rendered based on the relevant information, the image rendering accuracy can be improved.

According to the technical solution of this embodiment of the disclosure, by obtaining the target light source association information of the target object at different lighting angles and the target camera association information at different camera shooting angles, the target camera association information and the target light source association information are processed based on the pre-trained target object attribute determination model to obtain the target voxel association information of each voxel in the target object, and finally, based on the target voxel association information of each voxel in the target object, the target structure image corresponding to the target object is rendered. It solves the problems that an image rendering method adopted in the related art cannot determine an internal structure of the object, causing that a rendered schematic diagram is only a schematic diagram of an external structure, meanwhile, a schematic diagram of the internal structure cannot be obtained, and as a result, there is a significant difference between the rendered image and an actual image. It is achieved that in the image rendering process, the internal structure of the object is determined based on the light source information and camera position information, such that the rendered schematic diagram of the internal structure of the target object is matched with an actual structure of the target object, thereby improving accuracy of the rendered image compared to an image corresponding to the actual object, making the displayed image more vivid when the image is displayed on a display interface, and then improving use experience of the user are achieved.

Embodiment 3

Figure 3:
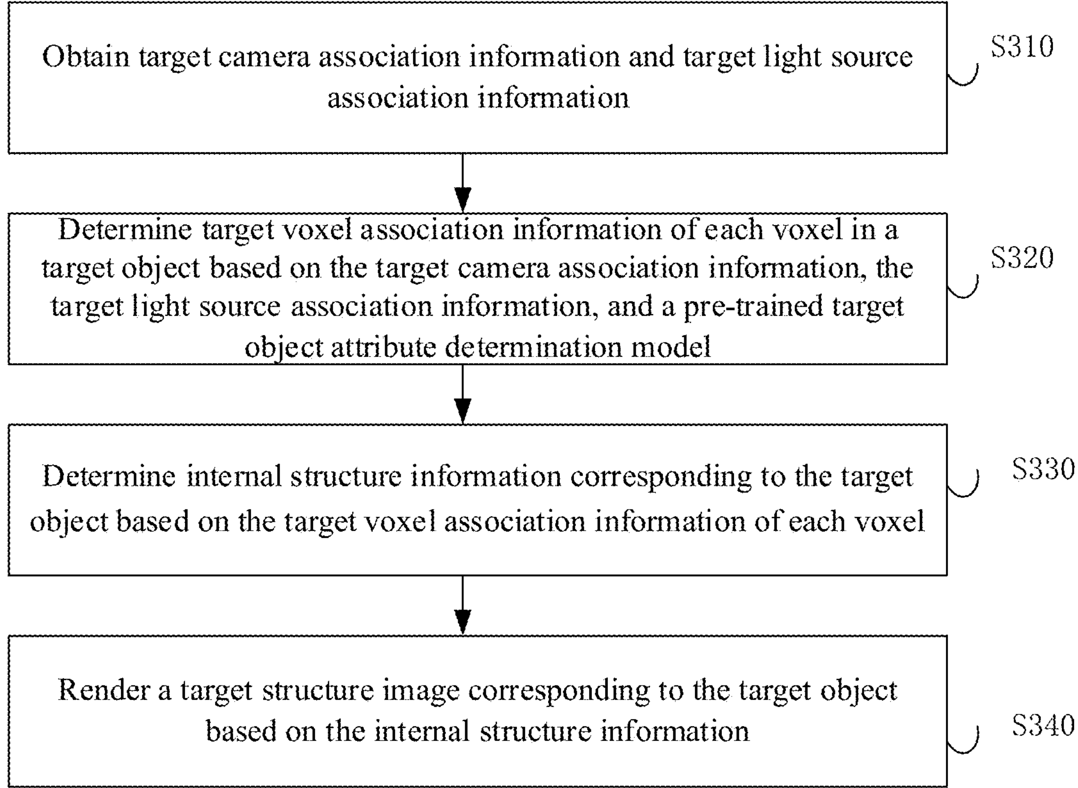
FIG. 3 is a flowchart of an image rendering method according to Embodiment 3 of the disclosure.

FIG. 3 is a schematic flowchart of an image rendering method according to Embodiment 3 of the disclosure. Based on the foregoing embodiment, S130 can be described, and for an implementation, reference may be made to the technical solution in this embodiment. Technical terms that are the same with or corresponding to those in the foregoing embodiment are not repeated herein.

As shown in FIG. 3, the method includes the following:

S310: target camera association information and target light source association information are obtained.

S320: target voxel association information of each voxel in a target object is determined based on the target camera association information, the target light source association information, and a pre-trained target object attribute determination model.

S330: internal structure information corresponding to the target object is determined based on the target voxel association information of each voxel.

The internal structure information may be structure information of different parts in the target object, and may be material information, smoothness information, light quantity information, or color information of the internal structure.

A geometric representation of the target object may be converted into a voxel representation of the object, that is, each voxel information of the target object is formed. A collection of all voxel information may be taken as a voxel dataset. The voxel dataset not only includes surface information of the target object but also includes internal information of the target object, namely, relevant information of each voxel inside. After the voxel association information is determined, a rendering technology may be utilized for rendering the voxel association information of each voxel, thereby obtaining a schematic diagram of a target structure of the target object.

Exemplarily, when target voxel association information of each voxel in a translucent jade stone is obtained, a rendering technology may be utilized for representing the target voxel association information of each voxel, a voxel image corresponding to each voxel may be rendered, and correspondingly, a diagram of a target structure of the whole target object may be obtained based on the voxel image of each voxel. Because the object attribute determination model is obtained after a specific camera parameter and light source parameter are processed, a target structure image of the target object under a view angle may be obtained.

S340: a target structure image corresponding to the target object is rendered based on the internal structure information.

Based on the internal structure information of the target object, a renderer can render the corresponding target structure image.

According to the technical solution of this embodiment of the disclosure, by obtaining the target light source association information of the target object at different lighting angles and the target camera association information at different camera shooting angles, the target camera association information and the target light source association information are processed based on the pre-trained target object attribute determination model to obtain the target voxel association information of each voxel in the target object, and finally, based on the target voxel association information of each voxel in the target object, the target structure image corresponding to the target object is rendered. It solves the problems that an image rendering method adopted in the related art cannot determine an internal structure of the object, causing that a rendered schematic diagram is only a schematic diagram of an external structure, meanwhile, a schematic diagram of the internal structure cannot be obtained, and as a result, there is a significant difference between the rendered image and an actual image. It is achieved that in the image rendering process, the internal structure of the object is determined based on the light source information and camera position information, such that the rendered schematic diagram of the internal structure of the target object is matched with an actual structure of the target object, thereby improving accuracy of the rendered image compared to an image corresponding to the actual object, making the displayed image more vivid when the image is displayed on a display interface, and then improving use experience of the user.

Embodiment 4

Figure 4:
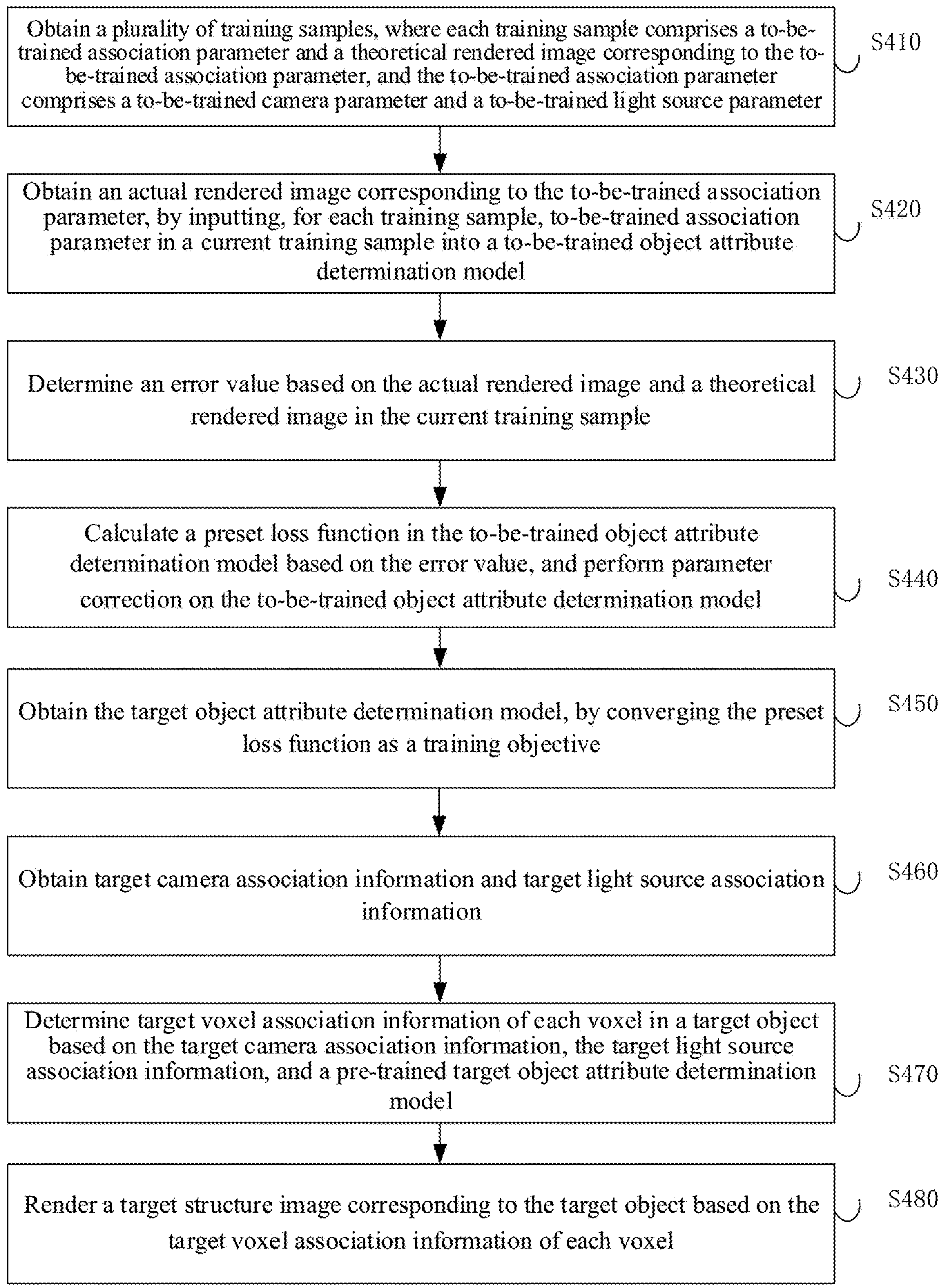
FIG. 4 is a flowchart of an image rendering method according to Embodiment 4 of the disclosure.

FIG. 4 is a schematic flowchart of an image rendering method according to Embodiment 3 of the disclosure. Based on the foregoing embodiment, before obtaining target camera association information and target light source association information, an to-be-trained object attribute determination model may be pre-trained to obtain a target object attribute determination model. For an implementation, reference may be made to the technical solution of this embodiment. Technical terms that are the same with or corresponding to those in the foregoing embodiment are not repeated herein.

As shown in FIG. 4, the method includes the following:

S410: a plurality of training samples are obtained. Each training sample includes a to-be-trained association parameter, and a theoretical rendered image corresponding to the to-be-trained association parameter. The to-be-trained association parameter includes a to-be-trained camera parameter and a to-be-trained light source parameter.

The training samples are used for model training. To obtain the target object attribute determination model corresponding to the object, the to-be-trained association parameter corresponding to the target object may be obtained. For example, the to-be-trained association parameter may be the to-be-trained camera parameter and the to-be-trained light source parameter during shooting the target object. In this case, the to-be-trained light source parameter and the to-be-trained camera parameter are represented by parameters of seven dimensions, that is, the purpose of obtaining the to-be-trained association parameter is to convert the to-be-trained association parameter into the parameters of seven dimensions, such that the to-be-trained association parameter are taken as an input for the to-be-trained object attribute determination model to obtain the target object attribute determination model through training. Correspondingly, to correct model parameters in the model, an image shot under the to-be-trained association parameter needs to be obtained, and is taken as the theoretical rendered image.

To make the obtained target object attribute determination model have high accuracy, as many diverse training samples as possible are obtained, such that the target object attribute determination model is obtained.

A plurality of to-be-trained camera parameter and to-be-trained light source parameter may be obtained, and when the object is irradiated based on the to-be-trained light source parameter, the theoretical rendered image including the target object is shot based on the to-be-trained camera parameter. To improve the accuracy of the obtained target object attribute determination model, as many training samples as possible are be obtained, such that the target object attribute determination model is obtained through training based on the obtained training samples.

S420: an actual rendered image corresponding to the to-be-trained association parameter is obtained, by inputting, for each training sample, to-be-trained association parameter in a current training sample into a to-be-trained object attribute determination model.

In this embodiment, the to-be-trained model may be a multi-layer perceptron (MLP) model with a parameter of 7 dimensions as an input. Model parameters of the to-be-trained object attribute determination model are default values. The to-be-trained object attribute determination model may be trained based on each training sample so as to obtain the target object attribute determination model. An output result of the to-be-trained object attribute determination model may be corresponding attribute information, and the image rendered based on the attribute information is taken as the actual rendered image.

Because the model parameter of the to-be-trained object attribute determination model is an initial value or parameter not fully corrected, the attribute information obtained in this case is inaccurate. Correspondingly, there is a certain difference between the actual rendered image rendered based on the attribute information and the theoretical rendered image in the training sample.

In other words, for each training sample, the to-be-trained association parameter in each training sample may be inputted into the to-be-trained object attribute determination model, the to-be-trained object attribute determination model may output actual attribute information, and the actual rendered image may be rendered based on the actual attribute information.

In this embodiment, obtaining the actual rendered image corresponding to the to-be-trained association parameter, by inputting the to-be-trained association parameter in the current training sample into the to-be-trained object attribute determination model includes: determining information of at least one to-be-trained sampling point corresponding to the to-be-trained association parameter; obtaining to-be-trained color information and to-be-trained light quantity information which are outputted by the to-be-trained object attribute determination model and correspond to the at least one to-be-trained sampling point, by inputting the information of the at least one to-be-trained sampling point into the to-be-trained object attribute determination model; and rendering, based on the to-be-trained color information and the to-be-trained light quantity information, an actual rendered image corresponding to the target object.

The to-be-trained sampling point may be a plurality of sampling points obtained by dividing the light ray based on the to-be-trained association parameter. The information of the to-be-trained sampling point may be length information of the to-be-trained sampling point relative to the light source and the like. The to-be-trained color information may be color information of the voxel corresponding to the to-be-trained sampling point, and the to-be-trained light quantity information may be light quantity information of the voxel corresponding to the to-be-trained sampling point. For example, the to-be-trained sampling point is located on the light ray, and when the light ray irradiates the object, the voxel color information and light quantity information corresponding to the respective sampling point may be determined. The principle is elaborated above, and therefore is not repeated herein.

S430: an error value is determined based on the actual rendered image and the theoretical rendered image in the current training sample.

The error value refers to an error between the actual rendered image and the theoretical rendered image.

S440: a preset loss function in the to-be-trained object attribute determination model is calculated based on the error value to perform parameter correction on the to-be-trained object attribute determination model.

A backpropagation method may be adopted to correct the model parameter in the to-be-trained object attribute determination model, ensuring that the final obtained target object attribute determination model can process the target light source association information and the target camera association information to obtain relatively accurate attribute information. Therefore, during image rendering based on the attribute information, the accuracy of the rendered image can be improved.

S450: the target object attribute determination model is obtained, by converging the preset loss function as a training objective.

The target object attribute determination model is a model which is finally obtained through training, and is configured to determine a diagram of a target structure of a target object corresponding to camera association parameter and light source association parameter.

A training error of the loss function, namely, a loss parameter may be taken as a condition for detecting whether the loss function reaches convergence at present, such as whether the training error is less than a preset error or whether an error variation trend tends to be stable, or whether the number of current iterations is equal to a preset number of times. If it is detected that the convergence condition is satisfied, for example, the training error of the loss function is less than the preset error or the error variation tends to be stable, it is indicated that training of the to-be-trained object attribute determination model is finished, and in this case, iterative training can be stopped. If it is detected that the convergence condition is not satisfied at present, the training samples may be obtained to train the to-be-trained object attribute determination model until the training error of the loss function is within a preset range. When the training error of the loss function converges, the to-be-trained object attribute determination model may be taken as the target object attribute determination model.

For each training sample, after a first training sample is subject to S420 to S440, a second training sample may be subject to S420 to S440 until the loss function in the to-be-trained object attribute determination model converges.

S460: target camera association information and target light source association information are obtained.

S470: target voxel association information of each voxel in a target object is determined based on the target camera association information, the target light source association information, and a pre-trained target object attribute determination model.

S480: a target structure image corresponding to the target object is rendered based on the target voxel association information of each voxel.

According to the technical solution of this embodiment of the disclosure, by obtaining the target light source association information of the target object at different lighting angles and the target camera association information at different camera shooting angles, the target camera association information and the target light source association information are processed based on the pre-trained target object attribute determination model to obtain the target voxel association information of each voxel in the target object, and finally, based on the target voxel association information of each voxel in the target object, the target structure image corresponding to the target object is rendered. It solves the problems that an image rendering method adopted in the related art cannot determine an internal structure of the object, causing that a rendered schematic diagram is only a schematic diagram of an external structure, meanwhile, a schematic diagram of the internal structure cannot be obtained, and as a result, there is a significant difference between the rendered image and an actual image. It is achieved that in the image rendering process, the internal structure of the object is determined based on the light source information and camera position information, such that the rendered schematic diagram of the internal structure of the target object is matched with an actual structure of the target object, thereby improving accuracy of the rendered image compared to an image corresponding to the actual object, making the displayed image more vivid when the image is displayed on a display interface, and then improving use experience of the user.

Embodiment 5

Figure 5:
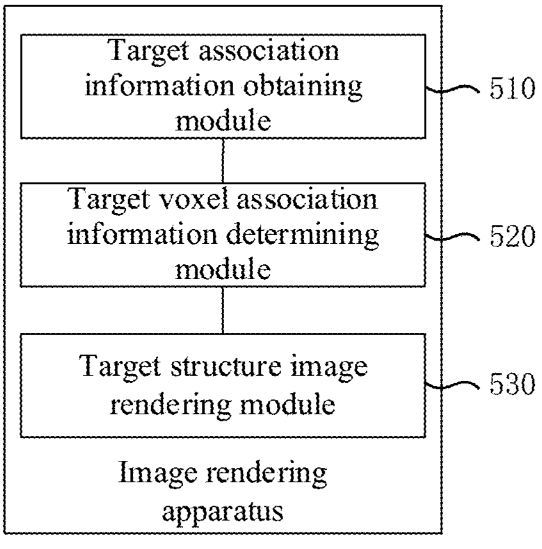
FIG. 5 is a structural block diagram of an image rendering apparatus according to Embodiment 5 of the disclosure.

FIG. 5 is a structural block diagram of an image rendering apparatus according to Embodiment 5 of the disclosure. The image rendering apparatus can execute the image rendering method provided by any embodiment of the disclosure, and has corresponding functional modules and effects for executing the method. As shown in FIG. 5, the apparatus includes: a target association information obtaining module 510, a target voxel association information determining module 520, and a target structure image rendering module 530.

The target association information obtaining module 510 is configured to obtain target camera association information and target light source association information. The target voxel association information determining module 520 is configured to determine target voxel association information of each voxel in a target object based on the target camera association information, the target light source association information, and a pre-trained target object attribute determination model. The target structure image rendering module 530 is configured to render a target structure image corresponding to the target object based on the target voxel association information of each voxel.

In an embodiment, the target association information obtaining module 510 is further configured to provide camera association information including a camera position and orientation information, and the light source association information includes a light source position and a lighting direction of a light source.

Based on the above technical solution, the target voxel association information determining module 520 includes a to-be-processed sampling point determining unit, a to-be-selected voxel association information determining unit, and a target voxel association information determining unit. The to-be-processed sampling point determining unit is configured to determine at least one to-be-processed sampling point on each light ray, by processing, based on a preset sampling point determination procedure, the target camera association information and the target light source association information. The to-be-selected voxel association information determining unit is configured to obtain to-be-selected voxel association information corresponding to each sampling point, by processing the at least one to-be-processed sampling point based on the target object attribute determination model. The target voxel association information determining unit is configured to determine the target voxel association information of each voxel based on the to-be-selected voxel association information corresponding to each sampling point.

In an embodiment, the target voxel association information at least includes color information and light quantity information of voxels. The light quantity information includes a reflection brightness value of light rays irradiating on the voxel, and a refraction brightness value of the light rays refracted from an interior of the voxel.

Based on the above technical solution, the target structure image rendering module 530 includes an internal structure information determining unit and a target structure image determining unit. The internal structure information determining unit is configured to determine internal structure information corresponding to the target object based on the target voxel association information of each voxel; and the target structure image determining unit is configured to render a target structure image corresponding to the target object based on the internal structure information.

Based on the above technical solution, the image rendering apparatus further includes a target object attribute determination model training module.

Based on the above technical solution, the target object attribute determination model training module includes a training sample obtaining unit, an actual rendered image obtaining unit, an error value determining unit, a parameter correction unit, and a target object attribute determination model determining unit. The training sample obtaining unit is configured to obtain a plurality of training samples, where each training sample includes to-be-trained association parameter, and a theoretical rendered image corresponding to the to-be-trained association parameter, and the to-be-trained association parameter include to-be-trained camera parameter and to-be-trained light source parameter. The actual rendered image obtaining unit is configured to obtain an actual rendered image corresponding to the to-be-trained association parameter, by inputting, for each training sample, to-be-trained association parameter in a current training sample into a to-be-trained object attribute determination model. The error value determining unit is configured to determine an error value based on the actual rendered image and a theoretical rendered image in the current training sample. The parameter correction unit is configured to calculate a preset loss function in the to-be-trained object attribute determination model based on the error value and perform parameter correction on the to-be-trained object attribute determination model. The target object attribute determination model determining unit is configured to obtain the target object attribute determination model, by converging the preset loss function as a training objective.

Based on the above technical solution, the actual rendered image obtaining unit includes a to-be-trained sampling point information subunit, a to-be-trained color information and to-be-trained light quantity information obtaining subunit, and an actual rendered image determining subunit. The to-be-trained sampling point information subunit is configured to determine information of at least one sampling point-to-be-trained corresponding to the to-be-trained association parameter. The color information-to-be-trained and light quantity information-to-be-trained obtaining subunit is configured to obtain to-be-trained color information and to-be-trained light quantity information which are outputted by the to-be-trained object attribute determination model and correspond to the at least one to-be-trained sampling point, by inputting the information of the at least one to-be-trained sampling point into the to-be-trained object attribute determination model. The actual rendered image determining subunit is configured to render, based on the to-be-trained color information and the to-be-trained light quantity information, an actual rendered image corresponding to the target object.

According to the technical solution of this embodiment of the disclosure, by obtaining the target light source association information of the target object at different lighting angles and the target camera association information at different camera shooting angles, the target camera association information and the target light source association information are processed based on the pre-trained target object attribute determination model to obtain the target voxel association information of each voxel in the target object, and finally, based on the target voxel association information of each voxel in the target object, the target structure image corresponding to the target object is rendered. It solves the problems that an image rendering method adopted in the related art cannot determine an internal structure of the object, causing that a rendered schematic diagram is only a schematic diagram of an external structure, meanwhile, a schematic diagram of the internal structure cannot be obtained, and as a result, there is a significant difference between the rendered image and an actual image. It is achieved that in the image rendering process, the internal structure of the object is determined based on the light source information and camera position information, such that the rendered schematic diagram of the internal structure of the target object is matched with an actual structure of the target object, thereby improving accuracy of the rendered image compared to an image corresponding to the actual object, making the displayed image more vivid when the image is displayed on a display interface, and then improving use experience of the user.

The image rendering apparatus provided by this embodiment of the disclosure can execute the image rendering method provided by any embodiment of the disclosure, and has corresponding functional modules and effects for executing the method.

The various units and modules included in the above apparatus are only divided according to functional logics, but are not limited to the above division, as long as the corresponding functions can be achieved; and in addition, the names of the plurality of functional units are only for the convenience of distinguishing each other, and are not intended to limit the scope of protection of this embodiment of the disclosure.

Embodiment 6

Figure 6:
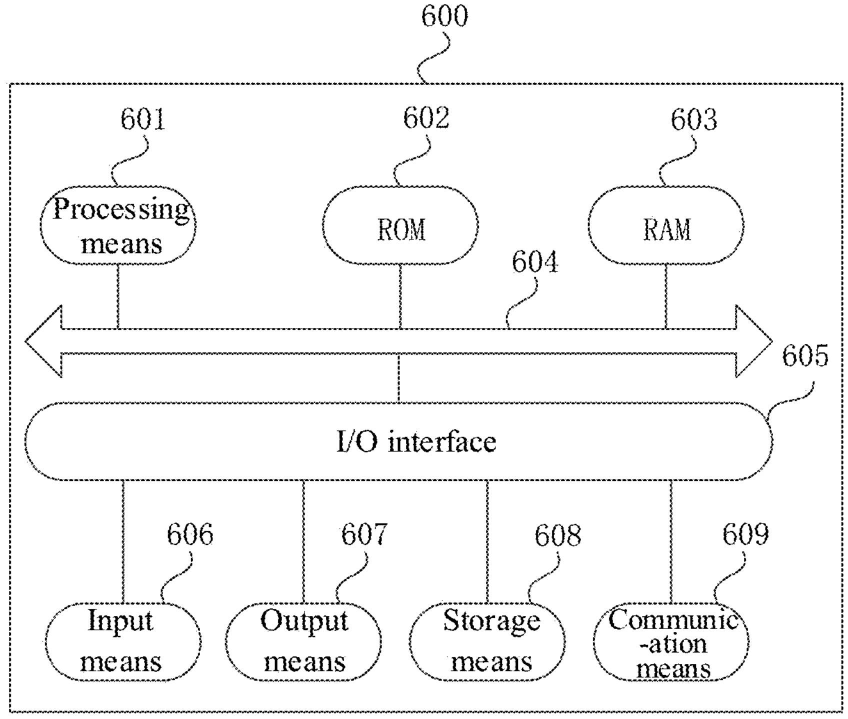
FIG. 6 is a structural schematic diagram of an electronic device according to Embodiment 6 of the disclosure.

FIG. 6 is a structural schematic diagram of an electronic device according to Embodiment 6 of the disclosure. Referring to FIG. 6 as below, FIG. 6 illustrates a structural schematic diagram of an electronic device (e.g., a terminal device or a server in FIG. 1) 600 applicable to implementing embodiments of the disclosure. The terminal device in this embodiment of the disclosure may include but not limited to mobile terminals such as a mobile phone, a notebook computer, a digital radio receiver, a personal digital assistant (PDA), a portable Android device (PAD), a portable media player (PMP), a vehicle-mounted terminal (e.g., a vehicle-mounted navigation terminal), and fixed terminals such as a digital television (TV) and a desk computer. The terminal device 600 shown in FIG. 6 is merely an example, which should not impose any limitations on functions and application ranges of this embodiment of the disclosure.

As shown in FIG. 6, the electronic device 600 may include a processing means (e.g., a central processing unit and a graphics processing unit) 601, which may perform various appropriate actions and processing according to programs stored on a read-only memory (ROM) 602 or loaded from a storage means 608 into a random access memory (RAM) 603. The RAM 603 further stores various programs and data required for the operation of the electronic device 600. The processing means 601, the ROM 602, and the RAM 603 are connected to one another through a bus 604. An input/output (I/O) interface 605 is also connected to the bus 604.

Typically, the following means may be connected to the I/O interface 605: an input means 606, including, for example, a touchscreen, a touchpad, a keyboard, a mouse, a camera, a microphone, an accelerometer, and a gyroscope; an output means 607, including, for example, a liquid crystal display (LCD), a speaker, and a vibrator; the storage means 608, including, for example, a magnetic tape and a hard drive; and a communication means 609. The communication means 609 may allow the electronic device 600 to be in wireless or wired communication with other devices for data exchange. Although FIG. 6 illustrates the electronic device 600 with various means, it is not necessary to implement or have all the shown means. Alternatively, more or fewer means may be implemented or provided.

According to this embodiment of the disclosure, the foregoing process described with reference to the flowchart may be implemented as a computer software program. For example, an embodiment of the disclosure includes a computer program product including a computer program stored on a non-transitory computer-readable medium. The computer program includes program code for executing the method shown in the flowchart. In this embodiment, the computer program may be downloaded and installed from the network by the communication means 609, or installed from the storage means 608, or installed from the ROM 602. The computer program, when executed by the processing means 601, performs the above functions limited in the method in this embodiment of the disclosure.

The names of messages or information exchanged between multiple apparatuses in the implementations of the disclosure are provided for illustrative purposes only, and are not intended to limit the scope of these messages or information.

The electronic device provided by this embodiment of the disclosure and the image rendering method provided by the foregoing embodiment belong to the same concept, and for technical details not described in detail in this embodiment, reference may be made to the foregoing embodiment. This embodiment and the foregoing embodiment have the same effects.

Embodiment 7

Embodiment 7 of the disclosure provides a computer storage medium, storing a computer program. The program, when executed by a processor, implements the image rendering method provided by the foregoing embodiment.

The computer-readable medium in the disclosure may be a computer-readable signal medium, or a computer-readable storage medium, or any combination thereof. For example, the computer-readable storage medium may include but not limited to: electrical, magnetic, optical, electromagnetic, infrared, or semiconductor systems, apparatuses, or devices, or any combination thereof. Examples of the computer-readable storage medium may include but not limited to: an electrical connection with one or more wires, a portable computer disk, a hard drive, a RAM, a ROM, an erasable programmable read-only memory (EPROM or a flash memory), fiber optics, a portable compact disc read-only memory (CD-ROM), an optical storage device, a magnetic storage device, or any proper combination of the above. In the disclosure, the computer-readable storage medium may be any tangible medium including or storing a program, and the program may be used by an instruction execution system, apparatus, or device, or used in conjunction with the instruction execution system, apparatus, or device. However, in the disclosure, the computer-readable signal medium may include data signals propagated in a baseband or propagated as a part of a carrier wave, which carry computer-readable program code. The propagated data signals may have a plurality of forms, including but not limited to electromagnetic signals, optical signals, or any proper combination of the above. The computer-readable signal medium may be any computer-readable medium other than the computer-readable storage medium. The computer-readable signal medium may send, propagate, or transmit the program used by the instruction execution system, apparatus, or device, or used in conjunction with the instruction execution system, apparatus, or device. The program code included in the computer-readable medium may be transmitted by any proper medium including but not limited to a wire, an optical cable, radio frequency (radio frequency), etc., or any proper combination of the above.

In some implementations, the client and the server can communicate using any currently known or future-developed network protocols such as a hypertext transfer protocol (HTTP), and may also be in communication connection with digital data in any form or medium (e.g., a communication network). For example, the communication network includes a local area network (LAN), a wide area network (WAN), Internet work (e.g., Internet), a peer-to-peer network (e.g., an ad hoc peer-to-peer network), and any currently known or future-developed networks.

The computer-readable medium may be included in the electronic device; and may separately exist without being assembled in the electronic device.

The computer-readable medium carries one or more programs. The one or more programs, when executed by the electronic device, enable the electronic device to: obtain target camera association information and target light source association information; determine target voxel association information of each voxel in a target object based on the target camera association information, the target light source association information, and a pre-trained target object attribute determination model; and render a target structure image corresponding to the target object based on the target voxel association information of each voxel.

The computer program code for executing the operations of the disclosure may be written in one or more programming languages or a combination thereof. The programming languages include but not limited to object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or entirely executed on the remote computer or server. In the case of involving the remote computer, the remote computer may be connected to the user computer via any type of network, including a LAN or WAN, or may be connected to an external computer (e.g., utilizing an Internet service provider for Internet connectivity).

The flowcharts and block diagrams in the accompanying drawings illustrate system architectures, functions, and operations possibly implemented by the system, method and computer program product according to the various embodiments of the disclosure. In this regard, each block in the flowcharts or block diagrams may represent a module, a program segment, or a portion of code, and the module, program segment, or portion of code includes one or more executable instructions for implementing specified logical functions. It should be noted that in some alternative implementations, functions marked in the blocks may also occur in an order different from that marked in the accompanying drawings. For example, two consecutively-shown blocks may actually be executed in parallel basically, but sometimes may also be executed in a reverse order, which depends on involved functions. It should be further noted that each block in the block diagrams and/or flowcharts as well as a combination of the blocks in the block diagrams and/or flowcharts may be implemented by using a dedicated hardware-based system that executes specified functions or operations, or using a combination of special hardware and computer instructions.

The units described in the embodiments of the disclosure may be implemented through software or hardware. The name of the unit does not limit the unit in a certain case. For example, a first acquisition unit may also be described as "a unit for acquiring at least two Internet protocol addresses".

The functions described above in this specification may be at least partially executed by one or more hardware logic components. For example, exemplary hardware logic components that can be used include but not limited to a field programmable gate array (FPGA), an application specific integrated circuit (ASIC), application specific standard parts (ASSPs), a system on chip (SOC), a complex programmable logic device (CPLD), etc.

In the context of the disclosure, a machine-readable medium may be a tangible medium that may contain or store a program, and the program may be used by an instruction execution system, apparatus, or device, or used in conjunction with the instruction execution system, apparatus, or device. The machine-readable medium may be a machine-readable signal medium or a machine-readable storage medium. The machine-readable medium may include but not limited to: electronic, magnetic, optical, electromagnetic, infrared, or semiconductor systems, apparatuses, or devices, or any proper combination of the above. Examples of the machine-readable storage medium may include: an electrical connection based on one or more wires, a portable computer disk, a hard drive, a RAM, a ROM, an EPROM or a flash memory, fiber optics, a CD-ROM, an optical storage device, a magnetic storage device, or any proper combination of the above.

According to one or more embodiments of the disclosure, Example 1 provides an image rendering method. The method includes:

obtaining target camera association information and target light source association information;

determining target voxel association information of each voxel in a target object based on the target camera association information, the target light source association information, and a pre-trained target object attribute determination model; and rendering a target structure image corresponding to the target object based on the target voxel association information of each voxel.

According to one or more embodiments of the disclosure, Example 2 provides an image rendering method, further including:

the camera association information includes a camera position and orientation information, and the light source association information includes a light source position and a lighting direction of a light source.

According to one or more embodiments of the disclosure, Example 3 provides an image rendering method, further including:

determining at least one to-be-processed sampling point on each light ray, by processing, based on a preset sampling point determination procedure, the target camera association information and the target light source association information;

obtaining to-be-selected voxel association information corresponding to each sampling point, by processing the at least one to-be-processed sampling point based on the target object attribute determination model; and determining the target voxel association information of each voxel based on the to-be-selected voxel association information corresponding to each sampling point.

According to one or more embodiments of the disclosure, Example 4 provides an image rendering method, further including:

the target voxel association information at least includes color information and light quantity information of voxels.

According to one or more embodiments of the disclosure, Example 5 provides an image rendering method, further including:

the light quantity information includes a reflection brightness value of light rays irradiating on the voxel, and a refraction brightness value of the light rays refracted from an interior of the voxel.

According to one or more embodiments of the disclosure, Example 6 provides an image rendering method, further including:

determining internal structure information corresponding to the target object based on the target voxel association information of each voxel; and rendering the target structure image corresponding to the target object based on the internal structure information.

According to one or more embodiments of the disclosure, Example 7 provides an image rendering method, further including:

obtaining the target object attribute determination model through training;

obtaining a plurality of training samples, wherein each training sample comprises a to-be-trained association parameter and a theoretical rendered image corresponding to the to-be-trained association parameter, and the to-be-trained association parameter comprises a to-be-trained camera parameter and a to-be-trained light source parameter obtaining an actual rendered image corresponding to the to-be-trained association parameter, by inputting, for each training sample, to-be-trained association parameter in a current training sample into a to-be-trained object attribute determination model;

determining an error value based on the actual rendered image and a theoretical rendered image in the current training sample;

calculating a preset loss function in the to-be-trained object attribute determination model based on the error value, and performing parameter correction on the to-be-trained object attribute determination model; and obtaining the target object attribute determination model, by converging the preset loss function as a training objective.

According to one or more embodiments of the disclosure, Example 8 provides an image rendering method, further including:

determining information of at least one to-be-trained sampling point corresponding to the to-be-trained association parameter;

obtaining to-be-trained color information and to-be-trained light quantity information which are outputted by the to-be-trained object attribute determination model and correspond to the at least one to-be-trained sampling point, by inputting the information of the at least one to-be-trained sampling point into the to-be-trained object attribute determination model; and rendering, based on the to-be-trained color information and the to-be-trained light quantity information, an actual rendered image corresponding to the target object.

According to one or more embodiments of the disclosure, Example 9 provides an image rendering apparatus, including:

a target association information obtaining module, configured to obtain target camera association information and target light source association information;

a target voxel association information determining module, configured to determine target voxel association information of each voxel in a target object based on the target camera association information, the target light source association information, and a pre-trained target object attribute determination model; and a target structure image rendering module, configured to render a target structure image corresponding to the target object based on the target voxel association information of each voxel.

Further, although the operations are described in a particular order, it should not be understood as requiring these operations to be performed in the shown particular order or in a sequential order. In certain environments, multitasking and parallel processing may be advantageous. Similarly, although several specific implementation details are included in the above discussion, these specific implementation details should not be interpreted as limitations on the scope of the disclosure. Certain features described in the context of separate embodiments may also be implemented in combination in a single embodiment. Conversely, various features described in the context of a single embodiment may also be implemented separately or in any suitable sub-combination in a plurality of embodiments.

I claim:

1. An image rendering method, comprising:

obtaining camera association information and light source association information;

determining voxel association information of each voxel in an object based on the camera association information, the light source association information, and a pre-trained object attribute determination model, wherein the voxel association information comprises light quantity information of a voxel, and the light quantity information comprises a reflection brightness value of light rays irradiating on the voxel and a refraction brightness value of the light rays refracted from an interior of the voxel; and rendering a structure image corresponding to the object based on the voxel association information of each voxel.

2. The method according to claim 1, wherein the camera association information comprises a camera position and orientation information, and the light source association information comprises a light source position and a lighting direction of a light source.

3. The method according to claim 2, wherein determining the voxel association information of each voxel in the object based on the target camera association information, the light source association information, and the pre-trained object attribute determination model comprises:

determining at least one to-be-processed sampling point on each light ray, by processing, based on a preset sampling point determination procedure, the camera association information and the light source association information;

obtaining to-be-selected voxel association information corresponding to each sampling point, by processing the at least one to-be-processed sampling point based on the object attribute determination model; and determining the voxel association information of each voxel based on the to-be-selected voxel association information corresponding to each sampling point.

4. The method according to claim 1, wherein the voxel association information further comprises color information of the voxel.

5. The method according to claim 1, wherein rendering the structure image corresponding to the object based on the voxel association information of each voxel comprises:

determining internal structure information corresponding to the object based on the voxel association information of each voxel; and rendering the structure image corresponding to the object based on the internal structure information.

6. The method according to claim 1, further comprising:

obtaining the object attribute determination model through training;

wherein obtaining the object attribute determination model through training comprises:

obtaining a plurality of training samples, wherein each training sample comprises a to-be-trained association parameter and a theoretical rendered image corresponding to the to-be-trained association parameter, and the to-be-trained association parameter comprises a to-be-trained camera parameter and a to-be-trained light source parameter;

obtaining an actual rendered image corresponding to the to-be-trained association parameter, by inputting, for each training sample, to-be-trained association parameter in a current training sample into a to-be-trained object attribute determination model;

determining an error value based on the actual rendered image and a theoretical rendered image in the current training sample;

calculating a preset loss function in the to-be-trained object attribute determination model based on the error value, and performing parameter correction on the to-be-trained object attribute determination model; and obtaining the object attribute determination model, by converging the preset loss function as a training objective.

7. The method according to claim 6, wherein obtaining the actual rendered image corresponding to the to-be-trained association parameter, by inputting the to-be-trained association parameter in the current training sample into the to-be-trained object attribute determination model comprises:

determining information of at least one to-be-trained sampling point corresponding to the to-be-trained association parameter;

obtaining to-be-trained color information and to-be-trained light quantity information which are outputted by the to-be-trained object attribute determination model and correspond to the at least one to-be-trained sampling point, by inputting the information of the at least one to-be-trained sampling point into the to-be-trained object attribute determination model; and rendering, based on the to-be-trained color information and the to-be-trained light quantity information, an actual rendered image corresponding to the object.

8. An electronic device, comprising:

at least one processor; and a storage means, configured to store at least one program, wherein when the at least one program is executed by the at least one processor, the at least one processor is caused to:

obtain camera association information and light source association information;

determine voxel association information of each voxel in an object based on the camera association information, the target light source association information, and a pre-trained object attribute determination model, wherein the voxel association information comprises light quantity information of a voxel, and the light quantity information comprises a reflection brightness value of light rays irradiating on the voxel and a refraction brightness value of the light rays refracted from an interior of the voxel; and render a structure image corresponding to the object based on the voxel association information of each voxel.

9. The electronic device according to claim 8, wherein the camera association information comprises a camera position and orientation information, and the light source association information comprises a light source position and a lighting direction of a light source.

10. The electronic device according to claim 9, wherein the at least one processor is caused to determine the voxel association information of each voxel in the object based on the camera association information, the light source association information, and the pre-trained object attribute determination model comprises being caused to:

determine at least one to-be-processed sampling point on each light ray, by processing, based on a preset sampling point determination procedure, the camera association information and the light source association information;

obtain to-be-selected voxel association information corresponding to each sampling point, by processing the at least one to-be-processed sampling point based on the object attribute determination model; and determine the voxel association information of each voxel based on the to-be-selected voxel association information corresponding to each sampling point.

11. The electronic device according to claim 8, wherein the voxel association information further comprises color information of the voxel.

12. The electronic device according to claim 8, wherein the at least one processor is caused to render the structure image corresponding to the object based on the voxel association information of each voxel comprises being caused to:

determine internal structure information corresponding to the object based on the voxel association information of each voxel; and render the structure image corresponding to the object based on the internal structure information.

13. The electronic device according to claim 8, wherein the at least one processor is further caused to obtaining the object attribute determination model through training;

wherein the at least one processor is caused to obtain the object attribute determination model through training comprises being caused to:

obtain a plurality of training samples, wherein each training sample comprises a to-be-trained association parameter and a theoretical rendered image corresponding to the to-be-trained association parameter, and the to-be-trained association parameter comprises a to-be-trained camera parameter and a to-be-trained light source parameter;

obtain an actual rendered image corresponding to the to-be-trained association parameter, by inputting, for each training sample, to-be-trained association parameter in a current training sample into a to-be-trained object attribute determination model;

determine an error value based on the actual rendered image and a theoretical rendered image in the current training sample;

calculate a preset loss function in the to-be-trained object attribute determination model based on the error value, and perform parameter correction on the to-be-trained object attribute determination model; and obtain the object attribute determination model, by converging the preset loss function as a training objective.

14. The electronic device according to claim 13, wherein the at least one processor is caused to obtain the actual rendered image corresponding to the to-be-trained association parameter, by inputting the to-be-trained association parameter in the current training sample into the to-be-trained object attribute determination model comprises being caused to:

determine information of at least one to-be-trained sampling point corresponding to the to-be-trained association parameter;

obtain to-be-trained color information and to-be-trained light quantity information which are outputted by the to-be-trained object attribute determination model and correspond to the at least one to-be-trained sampling point, by inputting the information of the at least one to-be-trained sampling point into the to-be-trained object attribute determination model; and render, based on the to-be-trained color information and the to-be-trained light quantity information, an actual rendered image corresponding to the object.

15. A non-transitory computer-readable storage medium, storing a computer program, wherein the program, when executed by a processor, implements:

obtaining camera association information and target light source association information;

determining voxel association information of each voxel in an object based on the camera association information, the light source association information, and a pre-trained object attribute determination model, wherein the voxel association information comprises light quantity information of a voxel, and the light quantity information comprises a reflection brightness value of light rays irradiating on the voxel and a refraction brightness value of the light rays refracted from an interior of the voxel; and rendering a structure image corresponding to the object based on the voxel association information of each voxel.

16. The non-transitory computer-readable storage medium according to claim 15, wherein the camera association information comprises a camera position and orientation information, and the light source association information comprises a light source position and a lighting direction of a light source.

17. The non-transitory computer-readable storage medium according to claim 16, wherein determining the voxel association information of each voxel in the object based on the camera association information, the light source association information, and the pre-trained object attribute determination model comprises:

determining at least one to-be-processed sampling point on each light ray, by processing, based on a preset sampling point determination procedure, the camera association information and the light source association information;

obtaining to-be-selected voxel association information corresponding to each sampling point, by processing the at least one to-be-processed sampling point based on the object attribute determination model; and determining the voxel association information of each voxel based on the to-be-selected voxel association information corresponding to each sampling point.

18. The non-transitory computer-readable storage medium according to claim 15, wherein the voxel association information further comprises color information of the voxel.

* * * * *